United States Patent
Robertson

(10) Patent No.: US 9,264,892 B2
(45) Date of Patent: Feb. 16, 2016

(54) METHOD AND APPARATUS FOR ATTACK RESISTANT MESH NETWORKS

(71) Applicant: Verizon Patent and Licensing Inc., Basking Ridge, NJ (US)

(72) Inventor: James Robertson, The Woodlands, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 317 days.

(21) Appl. No.: 13/935,310

(22) Filed: Jul. 3, 2013

(65) Prior Publication Data

US 2015/0010153 A1    Jan. 8, 2015

(51) Int. Cl.
| | |
|---|---|
| H04L 9/08 | (2006.01) |
| H04W 12/02 | (2009.01) |
| H04B 1/692 | (2011.01) |
| H04K 3/00 | (2006.01) |
| H04L 29/06 | (2006.01) |
| H04W 12/12 | (2009.01) |

(52) U.S. Cl.
CPC ............... *H04W 12/02* (2013.01); *H04B 1/692* (2013.01); *H04K 3/25* (2013.01); *H04L 63/061* (2013.01); *H04W 12/12* (2013.01)

(58) Field of Classification Search
CPC ........... H04B 1/692; H04K 3/25; H04K 3/60; H04K 3/80; H04L 63/061; H04W 12/02; H04W 12/04; H04W 12/12; H04W 16/06
USPC ........... 370/10, 464–468, 478, 480–482, 497, 370/514, 520, 524; 455/8–9, 20, 63.1, 63.3, 455/283–285, 410, 423, 447–449, 454–455, 455/456.4, 509, 515–516; 380/9, 13, 15, 380/44, 277–278, 283
See application file for complete search history.

(56) References Cited

U.S. PATENT DOCUMENTS

| | | | |
|---|---|---|---|
| 2005/0232207 A1* | 10/2005 | Antoniadis et al. ........... | 370/338 |
| 2005/0259647 A1* | 11/2005 | Wakumoto et al. ........... | 370/389 |
| 2008/0102793 A1* | 5/2008 | Ananthanarayanan et al. ............................. | 455/411 |
| 2008/0167063 A1* | 7/2008 | Nandagopalan et al. ...... | 455/522 |
| 2009/0103481 A1* | 4/2009 | Mahajan et al. ............... | 370/329 |
| 2010/0026549 A1* | 2/2010 | Weissman et al. .............. | 342/17 |
| 2010/0248667 A1* | 9/2010 | Daugherty et al. ......... | 455/226.1 |
| 2012/0051239 A1* | 3/2012 | Thai ............................... | 370/252 |
| 2013/0106640 A1* | 5/2013 | Wang et al. ..................... | 342/17 |

* cited by examiner

*Primary Examiner* — Charles C Jiang
*Assistant Examiner* — Mohamed Kamara

(57) ABSTRACT

A method, apparatus, and system for improved approaches for allowing new links of a mesh network to be formed during an attack of the network are described. The method includes selectively initiating a plurality of communication session establishment procedures to share connection information over a plurality of respective paths with a node of a mesh network, at least one of the paths being separated from the mesh network, wherein the connection information is used to establish one link of the mesh network.

18 Claims, 9 Drawing Sheets

100

400

400

400

METHOD AND APPARATUS FOR ATTACK RESISTANT MESH NETWORKS

BACKGROUND INFORMATION

Networking technologies using mesh techniques, such as mobile ad-hoc network (MANET), offer users the promise of increased reliability, security, and resistance to attack owing to the avoidance of relying on only a small number of critical infrastructure components. Additionally, mesh networks may utilize spread spectrum technologies such as frequency hopping and Direct Sequence Code Division Multiple Access (DS-CDMA) to provide further resistance to attack (e.g., signal jamming). However, mesh networking technologies, particularly MANETs utilizing spread spectrum wireless communications, may be unable to establish new links due to attacks, such as signal jamming. For instance, jamming of communication channels during a handshake phase may prevent nodes of a mesh network from sharing connection information necessary to establish jamming resistant links between nodes. In another example, jamming may prevent nodes of a mesh network from detecting each other, thereby preventing establishment of new links within a mesh network.

Therefore, there is a need for approaches allowing new links of a mesh network to be formed during an attack of the network, particularly a signal jamming of the network.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

Figure 1:
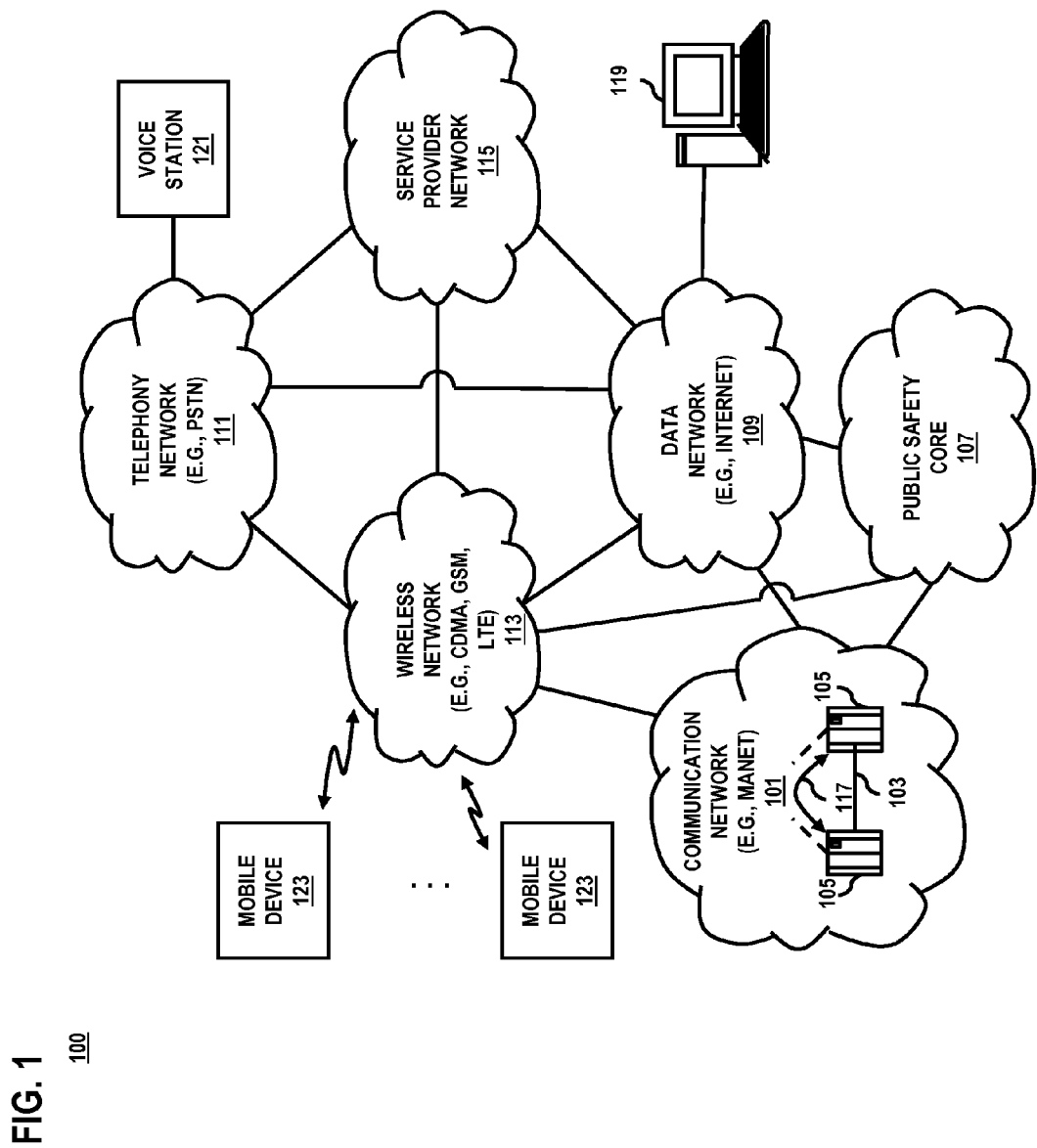
FIG. 1 is a diagram of a communication system capable of allowing new links of a mesh network to be formed during an attack of the network, according to various embodiments.

A preferred method, apparatus, and system for allowing new links of a mesh network to be formed during an attack of the network are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Embodiments provide an approach to resolving a seeming impasse which arises when one tries to apply signal jamming remediation techniques to a wireless mobile ad-hoc network, or MANET. In this section we describe this impasse and an approach for resolution. But before elaborating on the nature and specifics of this seeming impasse and the resolution approach, we first provide an overview of some of the factors and considerations motivating embodiments of the invention.

Many existing commercial wireless communications systems employ communications techniques which are vulnerable to efficient, stealthy signal jamming. An adversary possessing knowledge of the carrier frequency of transmission and symbol keying approach may easily and efficiently introduce corrupting symbols to intentionally jam or obscure legitimate messages, without resorting to high-power barrage jamming (which can be expensive and easy to detect and locate). Some concern has been raised over the danger of employing wireless techniques that are vulnerable to intentional signal jamming as the basis for public safety networks. Technologies that could be vulnerable to jamming include Orthogonal Frequency Division Multiple Access (OFDMA), which may employ many closely-spaced, fairly narrow-band subcarriers.

In contrast to commonly used, relatively narrow-band wireless approaches which are vulnerable to signal jamming, a number of so-called "spread spectrum" techniques are available, which provide a much higher degree of resilience against signal jamming. Spread spectrum techniques frequently use very wide-band, noise-like signals, often with low power density per unit of spectrum. Spread spectrum techniques include, for example, Frequency Hopping Spread Spectrum (FHSS) and Direct Sequence Spread Spectrum (DSSS). An example of the latter is Direct Sequence Code Division Multiple Access (DS-CDMA). Spread spectrum techniques may effectively "smear" the transmitted information across a wide frequency band; a band that is much wider than what is theoretically needed to carry a given transmission channel. Spread spectrum techniques, furthermore, allow several independent channels of communication to cohabit the same frequency band without mutual interference, thus realizing channel multiplexing. In addition to spread spectrum's advantage of jamming resilience, spread spectrum can provide other advantages, such as the potential for a radio receiver system to correlate and coherently sum several received multipath signals in order to obtain enhanced signal-to-noise ratio.

Another consideration in the design of a public safety network or other secure network is whether there are, on the one hand, but a few key, critical infrastructure components that could be compromised by an adversary, or if, on the other hand, a very large number of components provide sufficient redundancy such that compromise by the adversary would be far more difficult and impractical. Mesh networks, particularly MANETs comprised of often-mobile nodes, are attractive due to the robustness that commonly results from the potentially large number of routing nodes and myriad alternative pathways over which packets can be routed from source to destination. Because of this richness of redundancy in network components and alternative routes, MANET technology is of potential value in the technology mix of future public safety networks, perhaps playing the role of a crisis-mode adjunct to a baseline cell-oriented system. MANETs also may have great agility, allowing impromptu, ad-hoc network deployments to be made as needs arise.

The above considerations of (i) the robustness against jamming attacks that characterizes spread spectrum technology, and (ii) the desirable features of agility and redundancy inherent in MANET mesh technology leads us to consider wireless networks, especially emergency or public safety networks, that fuse spread spectrum technology together with MANET mesh technology. This fusion of mesh/MANET with spread spectrum communications thus forms a focus in the following discussions.

MANET networking frequently involves network nodes that can be constantly moving around in space. For example, a MANET node might be embedded in a vehicle (e.g., a taxi) or a hand-held device. Some nodes could play the role of routing intermediaries, while other nodes act as terminal nodes. Nodes in a MANET often have a dual character, and play the simultaneous roles of both terminal nodes and routing intermediaries carrying traffic originating and terminating on other endpoints. Since nodes frequently move about, and communications is typically relatively short range, it is common for a pair of nodes which previously had no direct communication link to come into radio range of each other and to establish a new communication link. Such communication links are commonly at the "Data Link" layer, or Layer 2, of the Open Systems Interconnection (OSI) network reference model. Conversely, as nodes move about, pairs of nodes who share existing direct communication links may lose contact, or experience degraded communications performance, as they go out of radio range with each other. Thus MANETs may be characterized by ever-changing network connectivity topology, with Layer 2 links between pairs of nodes being established and broken on a continual, on-going basis.

A general feature common to spread spectrum technologies (e.g., FHSS, DSSS, DS-CDMA, etc.) is that for two nodes to be able to communicate with each other, they agree upon a pseudo-random sequence of numerical values, or perhaps a shared random key or seed value that specifies the agreed upon pseudo-random sequence. In the case of frequency hopping (FHSS), the pseudo-random sequence plays the role of a frequency hopping "schedule." This schedule may dictate how the transmitter hops about in frequency space, how the receiver likewise hops in order to track the transmission, and how the receiver demodulates it. In the case of other spread spectrum technique like DS-CDMA, the pseudo-random number, or PN, sequence may define a high-rate, random-looking bit sequence (known as the "chip" bits) which is composited with the lower-rate message bits to form a transmitted signal that looks like noise and effectively spreads the transmission across a very wide band. One important thing to observe is that, despite the fact that the low-level details of techniques like FHSS and DSSS are very different, they have the common property of relying upon the receiver and transmitter possessing a shared knowledge of a pseudo-random sequence.

The pseudo-random sequence used by a sender/receiver pair communicating via a spread spectrum technique effectively defines, in one embodiment, a private communications "channel." If one is not privy to the details of this pseudo-random sequence, then one cannot track and demodulate the message bits. Likewise, if an adversary is not privy to the details of the pseudo-random sequence, then they will not be able to lock onto the channel and efficiently introduce confusing symbols to accomplish a jamming attack. Conversely, if the adversary somehow knew the details of the sequence, they would be able to effectively lock onto the transmission and jam it. Therefore, it is of great importance that the details of the key (which in some embodiments defines the pseudo-random sequence) be a secret that is shared only by the sender and receiver in each given node pair.

In light of the above discussion, it is clear that as nodes in the MANET network move about, and a pair of nodes may come into radio range of each other. Additionally, it is clear that, in some embodiments, the nodes will establish a shared secret in order for them to establish a private, jamming-resistant, spread spectrum wireless communication channel. This secret could be a large random number or character string which specifies, pins down or seeds the pseudo-random sequence which characterizes the private spread spectrum "channel" over which they will communicate data traffic. For full-duplex communication between a given pair of nodes, they may establish two such shared secrets, in order to support two private channels over which the node pair can converse simultaneously in both directions. We also note that in addition to the shared secret, system clock time may be an important factor allowing both sending and receiving nodes to generate and utilize the same pseudo-random sequence. Cryptographic techniques, such as Diffie-Hellman key exchange, provide viable protocols that may allow a pair of nodes to establish a shared secret key in such a manner that an adversary is unable to deduce the shared secret, even if the adversary is able to eavesdrop on the entire key-exchange protocol dialog between the nodes. Diffie-Hellman thus may protect the privacy of the established secret key. Given the shared secret, the node pair may proceed to communicate using a chosen spread spectrum communications approach. Once the wireless communications link at the Data Link Layer is established, mesh networking protocols may be used to update routing table information across the mesh to reflect the existence of the new link and allow the link to participate in packet routing over the mesh.

Given all of the above contextual discussion, we now arrive at the crux of the problem: Once the secret key exchange takes place, the pair of nodes can then establish a jamming-resilient, private spread spectrum channel over which they can communicate. But if such a jamming-resilient channel is able to exist only after the key exchange has occurred, then how can the pair of nodes carry out the key exchange protocol in the first place in such a way that the exchange protocol is not vulnerable to jamming? This represents the seeming impasse that needs to be resolved. In the following discussion, we present three broad approaches for carrying out the secret key exchange handshake, referring to these different approaches as "Approach A", "Approach B" and "Approach C". We argue that a principle insight for resolving the above-described seeming impasses is the realization that multiple such approaches to carrying out the key exchange handshakes must be available for use in combination.

The first approach, which we'll call "Approach A", to handling the communications for carrying out the secret key exchange is to use any one of many available relatively narrow-band wireless communications technologies for performing the key exchange. Or the key exchange handshake could occur over a spread spectrum channel which was established between the node pair via a key negotiation that, itself, is not robust against jamming attacks. Such technologies could include Wi-Fi, LTE, OFDMA and the like. Approach A does not itself resolve the problem of how to make the key exchange protocol interaction robust against jamming, since such relatively narrow-band communications technologies are vulnerable to jamming. But we include Approach A as part of the technology mix because it is a useful approach to have available when jamming attacks are not in progress.

The second approach that we consider ("Approach B") for carrying out the communications involved in secret key exchange is to assume that all nodes in the MANET system agree upon a specific channel (or a plurality of specific channels) that will be used solely for the purpose of carrying out key exchange handshakes between nodes that come into radio range. In the example, the "channel" is a spread spectrum channel that is specified by a given pseudo-random sequence of values, which in turn is specified by a shared secret key or seed value. In this scenario, all nodes participating in the MANET would have the value of the secret key (which defines the special handshake channel) stored in their internal memory. This approach to ensuring that the key exchange handshake between nodes is resilient against jamming attacks is only viable if all nodes in the system are "hardened" against an adversary reverse-engineering one of the devices and discovering the "baked in" secret key. For if an adversary were to succeed in such a reverse-engineering attack, and they successfully discovered the secret key that defines the special handshake channel, then that adversary would have the knowledge necessary to carry out an efficient jamming attack against key exchange handshakes between nodes. The effectiveness of this approach also depends upon organizations involved in the manufacture or initialization of node devices successfully guarding against insiders divulging such secret keys to an adversary. We also note that this approach of using a special, commonly agreed-upon channel for key exchange handshakes implies a managing of shared access to the channel by multiple nodes within radio range. Like any shared-medium networking system, Media Access Control, or MAC, techniques must be applied to manage the shared use of the special channel.

There are many approaches that could conceivably be pursued in order to harden node devices against a reverse engineering attack aimed at stealing the secret handshake keys. One such hardening technique would be to store secret keys internally in a node's volatile memory and, using capacitance sensors to detect a physical breach of the device housing, to wipe the volatile memory clean in the event that a physical breach is detected. Another approach to hardening a node device against attacks aimed at stealing the embedded secret key would be for the device to intentionally emit noisy radio frequency (rf) signals in order to mask rf emissions associated with computational operations so as to prevent an adversary from deducing the secret key by way of non-intrusive observation of such computer processing rf emissions. While such node hardening techniques could make it quite difficult for all but the most sophisticated of adversaries to successfully breach the device and discover the secret handshake key or keys, it seems highly desirable to have an alternative means of ensuring that the key exchange handshakes are not vulnerable to jamming attacks. It seems too risky to allow the efficacy of the jamming resilience of the whole system to all rest upon one secret key not falling into the hands of an adversary. That would represent a single point of vulnerability.

In the following, we describe a third approach (which we'll call "Approach C") to carrying out the key exchange handshake. This third approach includes embodiments designed in such a way that the exchange is resilient against jamming attempts. Furthermore, some embodiments of this third approach, discussed below, do not depend upon node hardware being hardened against attempts to steal a secret contained within the nodes.

Some embodiments of the third approach for carrying out secret key exchange handshakes are applicable to scenarios where the mesh network is under jamming attack, and allows the mesh to be sustained (e.g., kept alive) during such attacks. However, some embodiments of this third approach are not applicable to mesh bootstrapping scenarios. We find that a satisfactory total solution, in some embodiments, rests upon the availability of a combination of different communications mechanisms for carrying out the key exchanges. Thus, the resolution of the above-described seeming impasse revolves around the realization that no single method for performing the key-exchange handshake between nodes is adequate for handling all circumstances.

One such circumstance to be covered is the scenario where the mesh does not yet exist and must be bootstrapped into existence from a completely "cold" start as nodes first start coming into proximity. Another scenario is where an existing mesh is up and running, but a new node is introduced to the mesh for the first time. From a "cold", unconnected state, with no benefit of previous history within the mesh, such a node may handshake with the neighboring nodes with which it comes into proximity. In these scenarios, the bootstrapping of new nodes into a new or existing mesh depends upon the key-exchange handshake occurring directly over a radio link between the nodes, over a channel which is either vulnerable to jamming, or which has moderate protection against jamming by the node-hardening discussed above. Fortunately, for mesh networks that are generally up and running at all times within a region, most of the time intentional jamming attacks are not likely to be present. Most of the time, hand-shake channels that are not robust against jamming (Approach A above) or which are only moderately robust against jamming (Approach B above) will be adequate for bootstrapping new nodes into the mesh.

Now let's consider the scenario where at some moment in time the onset of an intentional jamming attack against the mesh network commences. At the moment of onset of the attack, the mesh, in the example, will be up and running, with a rich topology of interconnections between nodes already existing. In the example, the existing point-to-point connections between peer nodes in the mesh will be comprised of jamming-resilient spread spectrum wireless links. The onset of the jamming attack does not compromise the existing mesh of communications links. What may be compromised is the ability for new links to be formed as nodes move about, due to the jamming attack interfering with the key-exchange handshakes. In this exemplary attack-in-progress scenario, a major priority is to "sustain" the existing mesh. This priority of keeping the existing mesh alive focuses not so much upon bootstrapping new nodes into the mesh, but more upon allowing nodes that already belong to the mesh to form new peer-to-peer spread spectrum links as they move about in space. The basic idea of some embodiments of the "Approach C" is that even if a jamming attack is preventing a handshake protocol from being carried out over a "direct" wireless channel between a pair of nodes, it is likely that the two nodes in question will be able to "reach" each other over an indirect, multi-hop, routed path formed out of already-existing jamming-resilient spread spectrum channels. So long as the existing mesh has adequate spatial node density, the richness of routing paths will ensure, in the example, that two nodes coming into proximity will be able to conduct a key-exchange protocol over an indirect path.

So the seeming impasse (of how to exchange keys in a jamming-resilient manner, when jamming resilient channels exist only after the key has been exchanged) is resolved by, inter alia, allowing key exchanges to be performed over already-established, multi-hop paths. Some embodiments of this approach achieves a sort of best-of-both-worlds. The key exchange over direct, point-to-point wireless channels supports bootstrapping new nodes into the mesh under "normal" operating conditions; while key exchange over existing multi-hop routes allows the "sustaining" of the mesh network during the extraordinary conditions of intentional jamming attacks.

One might imagine that the system could be designed to detect the presence of an attack, which would allow for a sort of 2-mode model: under ordinary conditions the direct key-exchange approach would be used, but upon detection of jamming, the system could "cut over" to the multi-hop key exchange approach. This detect-and-cutover strategy is one option. However, in an alternative embodiment of the invention, such detection-followed-by-cutover strategy can be avoided. A less complex approach is for the mesh system to simply, on an ongoing basis, employ both direct and multi-hop routing approaches concurrently for carrying out key exchanges between nodes that are in proximity.

In order to put the approach outlined above in perspective, it is useful to look at the proposed jamming remediation solution in the context of the standard Open Systems Interconnection (OSI) 7-layer networking reference model. In an exemplary mesh network, the Layer 3 (Network Layer) routing is built over top the many Layer 2 data links that are established in point-to-point fashion between node pairs within radio range. In most networking systems, Layer 2 mechanisms exist autonomously as a substrate upon which higher layers can be built. In the exemplary jamming-resilient MANET network, this autonomy of the Layer 2 data links is only adhered to when we restrict the key-exchanges to the direct point-to-point approach. When we add the notion that existing multi-hop routed paths can be used for key exchange handshakes (in order to counter jamming attacks), we create a somewhat unconventional interaction between Layers 2 and 3. When key exchange occurs between two nodes via the multi-hop route, a Layer 3 capability is being leveraged for the purpose of providing an "assist" to Layer 2 in establishing a communications link at the Data Link Layer. Some might object to such a reverse-direction dependency of Layer 2 upon Layer 3. One consolation is that the bootstrapping of new nodes into the mesh does in fact follow the more conventional strict "layering", where the data link must come first before routing can happen (and not the reverse). Another thing which can help make the proposed, somewhat unconventional layer 2/3 interaction more palatable is to refrain from having Layer 2 technology stack logic within nodes make any calls "up" to Layer 3 of the stack for purposes of fetching newly exchanged shared keys established through Layer 3 routing. Rather, we propose that the multi-hop routing mechanism for key exchange which occurs at Layer 3 or above should, in the example, result in "calls down" to a Layer 2 interface. Such a Layer 2 interface allows the higher layers to essentially provide Layer 2 in the node's stack with "hints" of what secret keys might be tried in order to establish new data links.

By using an approach to key-exchange that involves communication over multi-hop routed paths, it is conceivable that pairs of nodes which are far out of radio range of each other may engage in a key exchange. Such a scenario would be, in may cases, highly wasteful, both in terms of the effort of exchanging keys over the multi-hop paths but also in terms of the fruitless effort of nodes trying to establish spread spectrum channels with other nodes that are completely out of radio range. It is clear that the multi-hop key exchange handshaking should be much more selective and limited to node pairs which stand a reasonable chance of being able to directly communicate with each other via point-to-point radio link. It may be beneficial to possess physical location awareness in order for the Layer 3 key exchanges to happen intelligently. One of the features of packet networking is the fact that physical location may be largely abstracted away, and behavior is largely location-agnostic.

In one embodiment for jamming-resilient mesh networks, such location awareness may be somehow restored. One approach for introducing the location awareness is to embed Global Positioning System (GPS) technology into node devices in order that nodes are aware, in real time, of their geo-spatial coordinates. We propose that mesh routing-maintenance protocols be augmented, in some embodiments, in order that node location information is propagated across the mesh in order that each node maintains an awareness of the other nodes' spatial locations. Routing tables within each node would be augmented so that node identities are mapped, not only onto next hop information, but also onto location coordinates of each node and/or physical distance to each node. With this location or distance information in place, we can implement a sort of physical-distance-constrained multicast. One can imagine an API (Application Programming Interface) function at or above Layer 3 which allows one to send data to all nodes located within a specified maximum physical radius of the sending node. Such a distance-constrained multicast function would, by using the distance data stored in the augmented routing tables, simply perform multiple unicast sends of the data to all nodes located within a specified physical radius (which in practice would be on the order of typical radio range) of the sending node. In one implementation, the sending node would not perform an exhaustive search through all nodes in the routing table to find the nodes within radio range; as an optimization, each node could, for example, maintain a "hash set" containing the identities of all the other nodes currently located within approximate radio range.

With some embodiments of this approach to physical-distance-constrained multicast in place, we imagine a process in place at Layer 3 or above which would, on a regular basis, send out key-exchange information (over indirect, multi-hop routes) to all nodes within approximate radio range. And concurrently, at Layer 2, similar key-exchange information would also be sent, in some embodiments, out via direct wireless broadcast or direct point-to-point wireless links to other nodes within radio range on a regular basis. In this way, we realize the above-discussed strategy of engaging in both direct and multi-hop key exchange, and accommodating both node bootstrapping scenarios and mesh-sustaining-during-attack scenarios. And as mentioned, the multi-hop key exchange occurring at or above Layer 3 may make calls "down" to Layer 2 of the node's communication stack in order to pass down "hints" to Layer 2 of channels to try establishing at the Data Link layer.

The above-described physical-distance-constrained-multicast approach of sending key exchange handshake information to nearby nodes (which depends upon the ongoing maintenance of location and/or distance information in routing tables on every node) is not the only conceivable embodiment of the general strategy of Layer 3 key exchange handshaking. In an alternative exemplary embodiment a sort of Layer 3 "broadcast" approach would be used. The idea is that at OSI Layer 3 (or above) a process on each node would repeatedly (e.g. periodically) send out a broadcast message that would fan out recursively across the mesh, such broadcast message carrying the physical location coordinates of the sending node along with the key-exchange (e.g. Diffie-Hellman) information necessary for accomplishing the key-exchange handshake. In some embodiments, such a broadcast could exhaustively span all nodes in the mesh. In other embodiments, the broadcast could be constrained to some reasonable upper hop-count limit, e.g. by sending a TTL (Time To Live)

count in the broadcast message, decrementing the TTL count by 1 each time the message is forwarded, and ceasing message forwarding when the TTL count drops to 0. Many embodiments would also take precautions against infinite message looping, using well-known techniques. Upon receiving such a broadcast message, each node, in some embodiments, would (in addition to performing any TTL calculations and message forwarding operations) calculate the Euclidean distance from itself to the location of the sending node. If the so-calculated physical distance is less than some agreed-upon approximate radio range, then the node which receives the broadcast message will proceed, in some embodiments, to use the received key-exchange handshake information to attempt to complete the establishment of a spread spectrum (Layer 2) data link with the sending node, if such a link does not already exist. If the physical distance exceeds the agreed-upon approximate radio range, then the receiving node will, in some embodiments, only engage in message forwarding, but will otherwise ignore the broadcast message.

Summarizing, we have at least two alternative embodiments, specifically: (i) the physical-distance-constrained multicast approach, where routing tables at every node maintain on an ongoing basis the coordinates of or physical distance to every other node in the mesh, and each node selectively sends Layer 3 unicast messages containing handshake information to every other node within a threshold range according to the sender's routing table distance information; and (ii) the Layer 3 broadcast approach, in which each node sends out a message containing the handshake information and the sender's physical location, such message gets recursively propagated across the mesh (in either hop-count-constrained or unconstrained fashion), and each receiving node decides, based upon its own coordinates and the coordinates of the message sender, whether to ignore the message or proceed with an attempt to establish a Layer 2 link with the sender.

In one exemplary embodiment of the invention, a Diffie-Hellman approach would be employed for a pair of nodes to establish a shared secret key which specifies a unique spread spectrum channel between the pair. Essentially the same key exchange technique would be carried out by both the Layer 2 (direct) approach and the Layer 3 (multi-hop) approach discussed above. With an exemplary Diffie-Hellman key exchange approach, all nodes in the mesh would store and use a commonly agreed-upon large prime number, 'p', and a number 'g' which is a so-called "generator" of the modular integer group of order 'p'. The integers, 'p' and 'g', are not secrets. Furthermore, each node, 'n', would create (e.g. using a hardware-based "true" random number generator) and store a pair of large random positive integers (less than 'p'), which we will call $x\_n$ and $y\_n$. These integers, $x\_n$ and $y\_n$, are maintained as secrets known only to node 'n'. The reason why there are two such integers is so that we can establish two shared secrets and two spread spectrum channels between each pair of nodes, thus allowing the support of full-duplex communications. Node 'n' would also calculate and store the pair of integers $X\_n$ and $Y\_n$, where $X\_n$ is defined as $g^{\wedge}x\_n \bmod(p)$, $Y\_n$ is defined as $g^{\wedge}y\_n \bmod(p)$, and the '^' symbol denotes raising the left-hand operand to the power indicated by the right-hand operand.

In the above discussion, we referred to the processes at Layers 2 and 3 (or above) as regularly sending out "key exchange information" to neighboring nodes via the direct and multi-hop approaches. Stated more concretely, when using the Diffie-Hellman approach, the "key exchange information" that each node sends to its neighbors is the triplet (ID\_n, X\_n, Y\_n), where ID\_n denotes the identifier by which node n is known within the mesh network, and X\_n and Y\_n are defined above. Each node, 'n', maintains an associative data structure (e.g. a hash) which maps node identifiers, ID\_m, of neighbors, 'm', onto exchanged secret keys for the node pair (n, m). When Layer 2 code of node 'n' receives the triplet (ID\_m, X\_m, Y\_m) from node 'm', it will calculate the numbers S\_n,m and R\_n,m, where these are defined as $S\_n,m = X\_m^{\wedge}y\_n \bmod(p)$ and $R\_n,m = Y\_m^{\wedge}x\_n \bmod(p)$. Node 'n' will store in the above-mentioned associative data structure the pair (S\_n,m, R\_n,m) as the value associated with the hash key ID\_m. As an optimization, node 'n' may first check whether it already stores an association for neighbor ID\_m, and if so, it can skip the step of re-calculating and storing the pair S\_n,m and R\_n,m.) The pair (S\_n,m, R\_n,m) represent the secret keys that node n may use in order to establish the private spread spectrum channels which it will use for, respectively, sending data to, and receiving data from, node m. Using this same approach, node 'm' may also obtain a quantity R\_m,n that is the same as S\_n,m; and will obtain a quantity S\_m,n that is the same as R\_n,m. In other words, the nodes n and m may arrive at a common secret that will be used for node 'm' to send data to node 'n', and another common secret that node 'n' will use to send data to node 'm'. Once a node 'n' establishes a new triplet (ID\_m, S\_n,m, R\_n,m), it can start sending out data-link initialization pings to node 'm' over the channel defined by S\_n,m; and it can start listening for data-link initialization pings coming from node 'm' over the channel defined by R\_n,m. Once both the sending and receiving nodes possess the shared keys, are talking/listening on the so-defined channels, and complete an initialization handshake exchange (the details of which could take on a variety of forms consistent with various embodiments of the invention), the Layer 2 data-link becomes established between the node pair. After the data-links in both directions are established, then the link may become fully operational for full-duplex communication.

Summarizing, we have arrived at the following picture of a jamming-resilient mesh network: The exemplary MANET mesh packet-routing network is layered over a Data Link Layer consisting of point-to-point wireless communications links between nodes, each such communication link being based upon a private spread spectrum channel. The establishment of each such exemplary spread spectrum channel between a given node pair is based on the execution of a key exchange protocol between the nodes of the pair. At least 3 different communications approaches (let's call them Approaches A, B and C) can be adopted for carrying out such key exchange hand-shakes between nodes, and indeed, multiple such approaches can and should be used in parallel in order to provide mesh operation and robustness under a variety of scenarios. Approach A for carrying out such key exchange handshakes uses a narrow-band technology, for example 802.11, OFDMA or such, with the understanding that, while such handshake channels may be adequate for establishing links under "normal" operating conditions, these channels may be rendered inoperable in the face of a jamming attack. Approach B for performing the key exchange handshakes consists of using designated, "special" spread spectrum channels between pairs of nodes, such "special" channels being dedicated to the role of handshake interactions; they may play no role in bearing the actual data and signaling traffic that passes over the established link during the course of mesh operation. These special spread spectrum channels are specified by one or more secret keys that are "baked into" node hardware, and resistance against jamming attacks relies upon adversaries not discovering the secrets that define the special channels. Some embodiments of Approach C for performing the key exchange handshakes use existing Layer 3, multi-hop routed paths between a pair of nodes in order to carry the handshake data. Some embodiments of Approach C can furthermore utilize spatial location technology, such as GPS (or other physical distance estimation techniques) in order for the mesh to make informed decisions of which nodes are within approximate radio range and should carry out secret key exchanges. And still further, we have described two alternative embodiments of Approach C which are based upon (i) maintenance of physical distance information in node routing tables, and selective distance-constrained multicast; and (ii) Layer 3 recursive broadcast of sender location and handshake information across the mesh, wherein receiving nodes ignore or act upon the message based upon coordinates of sender and receiver. The use of a combination of the above key exchange communications approaches ensures that both bootstrapping of nodes and the sustaining of the mesh in the presence of signal jamming attempts can be supported.

FIG. 1 is a diagram of a communication system capable of allowing new links of a mesh network to be formed during an attack of the network, according to various embodiments. For illustrative purposes, system 100 is described with respect to a communication network 101 employing a mesh topology. Depending on the particular implementation, such topology can be partial or fully meshed and may be combined with other topologies. In this example, the communication network 101 is configured to establish links 103 between multiple nodes 105 (e.g., mobile devices). According to certain embodiments, the links 103 are wireless and may utilize various attack resistant technologies, such as, for example, spread spectrum technology. Further, links 103 may have the same or different signal parameters, such as frequency hopping schedule, pseudo random noise (chip) sequence, and the like. In one embodiment, links 103 are established (during a handshake phase) using a narrow-band broadcast communication channel (not shown) known to nodes 105. In other embodiments, links 103 are established using private spread spectrum channels, known to nodes 105, such private channels being dedicated to the task of link establishment. In other embodiments, links 103 are established via handshake exchanges communicated over multi-hop routes at OSI Layer 3. In yet other embodiments, multiple such link establishment approaches as discussed in this paragraph may be used in combination and concurrently. Under the example of FIG. 1, a public safety core 107 can be utilized as part of a service provider's architecture. In this example, the public core 107 allows emergency responders nationwide to communicate with each other. The communication network 101 may route network traffic between nodes 105 using links 103 to public safety core 107 and one or more networks (e.g., data network 109, telephony network 111, wireless network 113, service provider network 115, etc.) In this manner, the communication network 101 provides nodes 105 reliable, secure, and resilient access with each other and to the public safety core 107 and the one or more networks 109-115. In FIG. 1, various arcs that connect one communications "cloud" to another may each represent one or more "gateway" nodes that simultaneously participate in multiple network clouds and pass network traffic between the clouds. We also note that two nodes 105 within the mesh network 101 can communicate with each other over routes that never leave the mesh, or alternatively over routes which exit the mesh 101 and traverse one or more of the depicted networks 107-115 before re-entering the mesh 101. Furthermore, communication network 101 may be configured to allow great agility, and rapid impromptu deployment of portable routing nodes (e.g., 105) into wireless-challenged environments such as subway tunnels, skyscraper sub-basements, and the like. We further note that at the physical layer (PHY) the wireless communications mechanism could utilize a variety of different symbol keying techniques, such as, for example, Binary Phase Shift Keying (BPSK), Frequency Shift Keying (FSK), Pulse Amplitude Modulation (PAM), or Quadrature Amplitude Modulation (QAM).

As used herein, a communication channel may be established using any communication protocol and technology (e.g., a near field communication (NFC), for instance, LTE, BLUETOOTH, WIFI, WIMAX, peer-to-peer (P2P), multicast, and the like). In another embodiment, the communication channel utilizes a secure tunneling protocol to establish a secure path through data network 109 and/or wireless network 113. Additionally, the communication channel may be established using auto-pairing technologies, such as ANDROID BEAM. Although NFC may be considered as being of little use as a data link medium in a wireless mesh, since the range is limited to a few centimeters, NFC can play a role during the key-exchange handshake phase necessary for creation of jamming-resilient data links. For example, if one imagines a scenario where emergency responders have a "cache" of several rapidly-deployable mesh node devices on their persons or stowed in their vehicles, the mesh data links amongst such nodes could be established via NFC, e.g. literally "bumping" the devices together with each other. Such a cache of rapidly deployable nodes could thus already form a mesh network among themselves prior to being deployed in the field and being linked in to a larger mesh. In some embodiments, the communication channel may be separated from the communication network 101, for instance, by utilizing different communication protocols, technologies, frequency channels, media, and the like.

As mentioned, users (e.g., emergency responders) benefit from reliable, secure, and resilient mesh networks to exchange data. However, wireless links may become unreliable if interference or jamming occurs and as nodes (e.g., 105) move. The continual breaking of data links between node pairs as nodes move out of communication range is, indeed, a normal occurrence in the operation of MANET mesh networks. Consequently, establishment of other links may be necessary to circumvent the source of the disruption. The discovery of potential new links of a mesh network and establishment of new links frequently cause an exchange of information (e.g., via Diffie-Hellman key exchange). Such an exchange of information typically utilizes communication channels that are vulnerable (e.g., narrow-band) to targeted network attacks such as jamming. As such, maintaining secure mesh networks, particularly adding new links to an existing mesh network, in some instances may be prevented by such network attacks.

To address this issue, the system 100 of FIG. 1 introduces the capability of exchanging connection information, such as a security key (e.g., a secret key that specifies a spread spectrum private channel and which is established among a pair of nodes via Diffie-Hellman key exchange) on a pathway 117 of one or more existing links 103 connecting nodes 105. New links of communication network 101 may be formed, in some instances even during a network attack, by utilizing spread spectrum techniques: for example one or more embodiments of "Approach C" discussed above, where key exchange occurs over multi-hop paths traversing a number of separate spread spectrum data links. Further, communication network 101 (or nodes 105) may be configured to locate other nodes 105 with which to establish a new link (e.g., 103). By way of example, node 105, as part of a public emergency service, broadcasts location information along with connection information to establish a secure connection to other nodes 105 that are designated as emergency equipment via the pathway 117. This other emergency equipment receives the location and connection information and establishes the secure, jamming-resilient connection (e.g., link 103).

Figure 7:
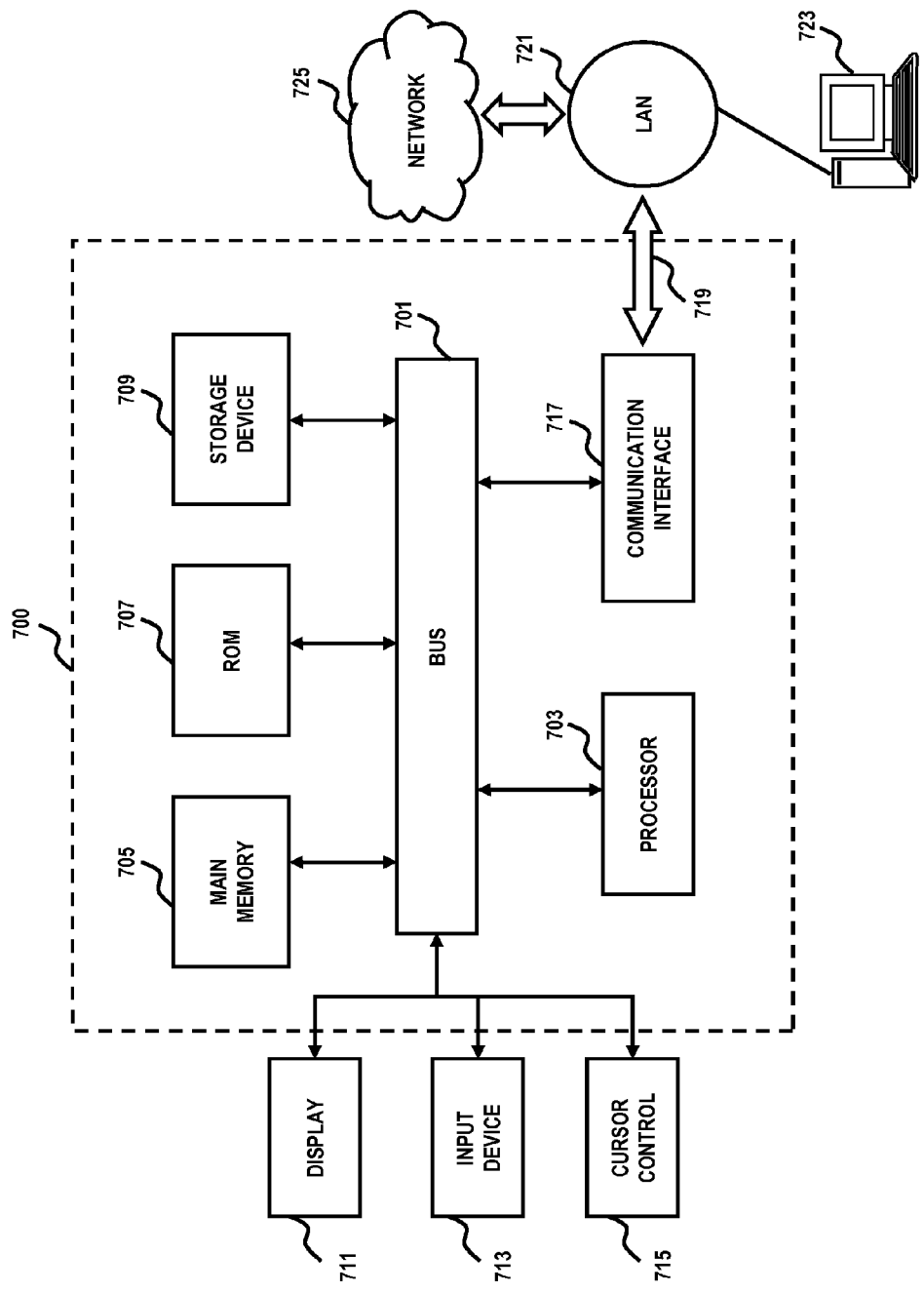
FIG. 7 is a diagram of a computer system that can be used to implement various exemplary embodiments.
Figure 8:
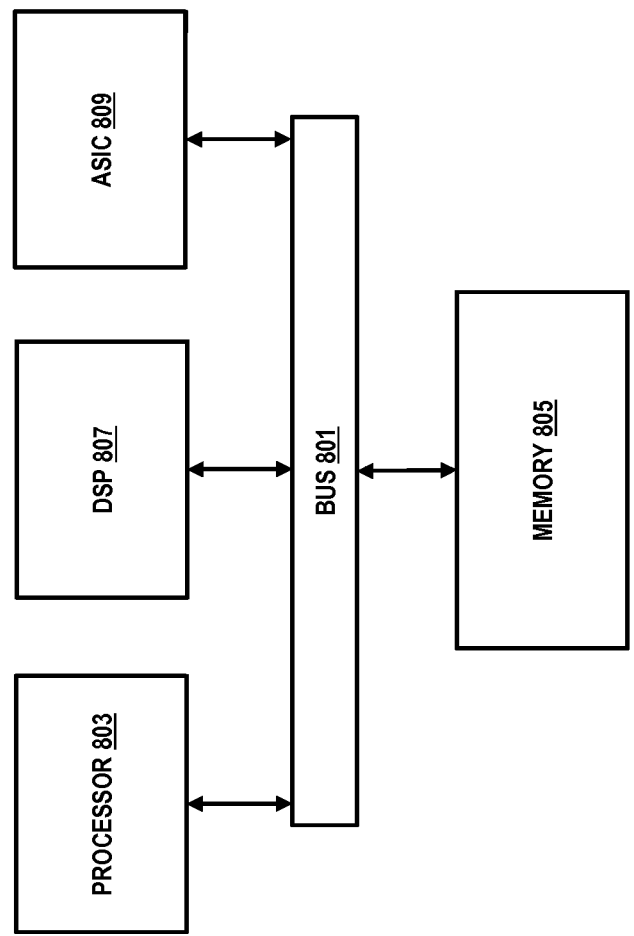
FIG. 8 is a diagram of a chip set that can be used to implement various exemplary embodiments.

As used herein, nodes 105 may be any type of terminal and/or router including the computer system of FIG. 7, the chip or chip set of FIG. 8, a mobile handset, mobile station, mobile unit, multimedia computer, multimedia tablet, communicator, netbook, Personal Digital Assistants (PDAs), smartphone, media receiver, embedded electronics, etc. Nodes 105 may be mobile, for instance, deployed via air drop or attached to motor vehicles (e.g., emergency vehicles) or may be static, for instance, attached to structures (e.g., buildings, communication towers, subway stations, etc.) It is also contemplated that nodes 105 may support any type of interface for supporting the presentment or exchange of data. In addition, nodes 105 may facilitate various input means for receiving and generating information, including touch screen capability, keyboard and keypad data entry, voice-based input mechanisms, accelerometer (e.g., shaking nodes 105), and the like. Any known and future implementations of nodes 105 are applicable. Furthermore, nodes 105 may be configured to utilize various protocols and routing, such as, for example, MITRE's MMLDP/MMRP/MMBDP, Better Approach to Mobile Ad-hoc networking (BATMAN), OLSR, ACOR, AODC, dynamic source routing, dynamic MANET on-demand routing, IERP, RDMAR, ZRP, CBRP, FSR, IMEP, and the like.

According to certain embodiments, the communication network 101 and/or nodes 105 may interact with a public safety network, such as public safety core 107. The public safety core 107 may be any suitable wireline and/or wireless network, and be managed by one or more service providers. By way of example, the public safety core 107 may include an administrative system to ensure that public safely users have adequate capacity and service and an interoperability center to ensure that first responders nationwide can communicate with each other. It is contemplated that public safety core 107 could benefit from communication network 101, particularly when utilizing the methods and embodiments illustrated in FIGS. 1-8.

Additionally or alternatively, the communication network 101 and/or nodes 105 may interact with one or more networks, such as the data network 109, the telephony network 111, the wireless network 113, and/or the service provider network 115. The networks 109-115 may be any suitable wireline and/or wireless network, and be managed by one or more service providers. For example, the data network 109 may be any local area network (LAN), metropolitan area network (MAN), wide area network (WAN), the Internet, or any other suitable packet-switched network, such as a commercially owned, proprietary packet-switched network, such as a proprietary cable or fiber-optic network. For example, computing device 119 may be any suitable computing device, such as a VoIP phone, skinny client control protocol (SCCP) phone, session initiation protocol (SIP) phone, IP phone, personal computer, softphone, workstation, terminal, server, etc. The telephony network 111 may include a circuit-switched network, such as the public switched telephone network (PSTN), an integrated services digital network (ISDN), a private branch exchange (PBX), or other like network. For instance, voice station 121 may be any suitable plain old telephone service (POTS) device, facsimile machine, etc. Meanwhile, the wireless network 113 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. As shown, the wireless network 113 interacts with mobile devices 123.

According to certain embodiments, mobile devices 123 may be any type of mobile terminal including a mobile handset, mobile station, mobile unit, multimedia computer, multimedia tablet, communicator, netbook, Personal Digital Assistants (PDAs), smartphone, media receiver, etc. It is also contemplated that mobile devices 123 may support any type of interface for supporting the presentment or exchange of data. In addition, mobile devices 123 may facilitate various input means for receiving and generating information, including touch screen capability, keyboard and keypad data entry, voice-based input mechanisms, accelerometer (e.g., shaking the mobile device 123), and the like. Any known and future implementations of mobile devices 123 are applicable. It is noted that, in certain embodiments, mobile devices 123 may be configured to transmit information (e.g., audio signals, words, address, etc.) using a variety of technologies—e.g., NFC, BLUETOOTH, infrared, etc. Also, connectivity may be provided via a wireless local area network (LAN). By way of example, a group of mobile devices 123 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each mobile device 123, e.g., IP addresses that are accessible to devices connected to the service provider network 115 as facilitated via a router.

Although depicted as separate entities, the networks 109-115 (and core 107) may be completely or partially contained within one another, or may embody one or more of the aforementioned infrastructures. For instance, the service provider network 115 may embody circuit-switched and/or packet-switched networks that include facilities to provide for transport of circuit-switched and/or packet-based communications. It is further contemplated that the networks 109-115 (and core 107) may include components and facilities to provide for signaling and/or bearer communications between the various components or facilities of the system 100. In this manner, the networks 109-115 (and core 107) may embody or include portions of a signaling system 7 (SS7) network, IMS, or other suitable infrastructure to support control and signaling functions.

While specific reference will be made thereto, it is contemplated that the system 100 may embody many forms and include multiple and/or alternative components and facilities.

Figure 2:
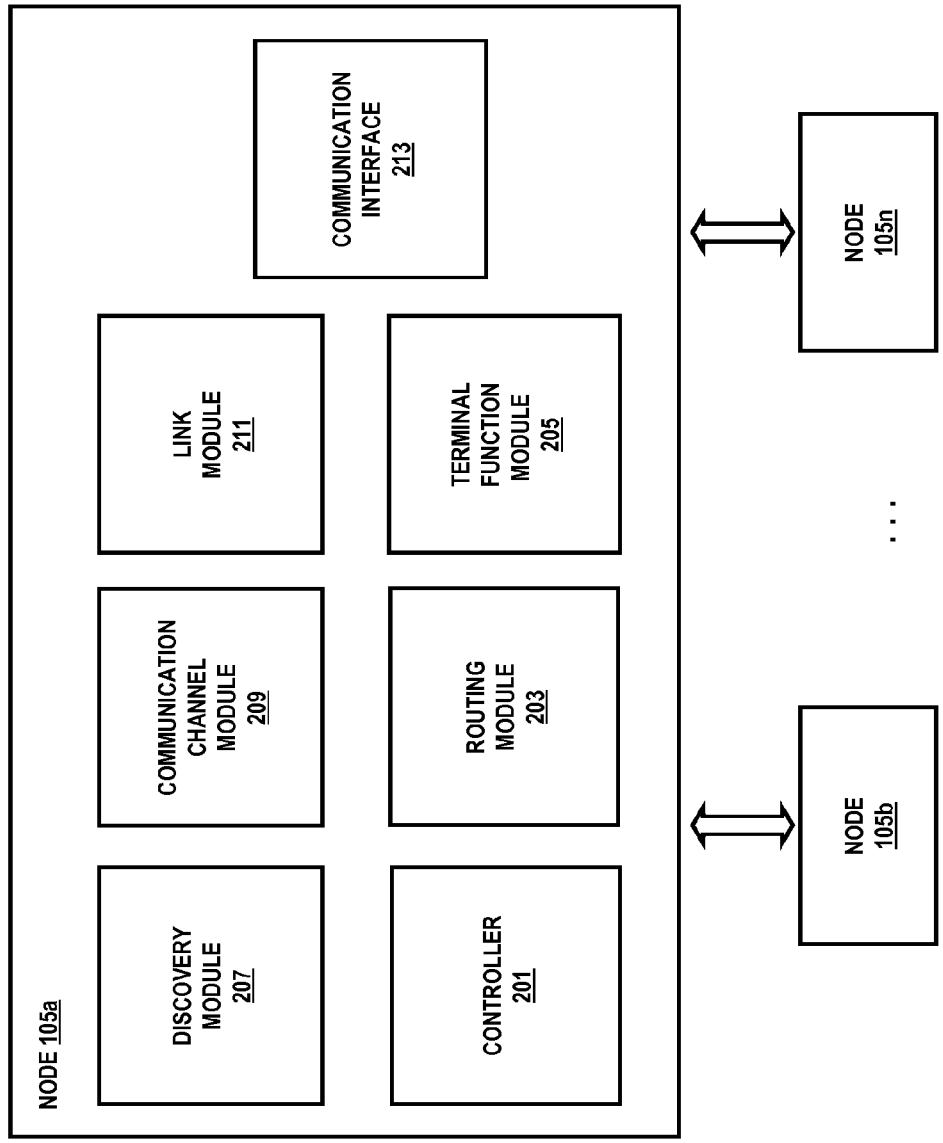
FIG. 2 is a diagram of a node capable of establishing new links during an attack of the network, according to various embodiments.

FIG. 2 is a diagram of a node capable of establishing new links during an attack of the network, according to various embodiments. The node 105a may comprise computing hardware (such as described with respect to FIGS. 7 and 8), as well as include one or more components configured to execute the processes described herein for providing new links of a mesh network to be formed during an attack of the network (e.g., communication network 101) of the system 100. It is contemplated that the functions of these components may be combined in one or more components or performed by other components of equivalent functionality. In one implementation, the node 105a includes a controller 201, routing module 203, terminal function module 205, discovery module 207, communication channel module 209, link module 211, and communication interface 213. As previously noted, each node 105 may be directly connected to other nodes (e.g., nodes 105b-105n).

The controller 201 executes at least one algorithm for executing functions of node 105a. For example, the controller 201 interacts with the communication interface 213 to identify and exchange data traffic, for instance, indicating information for establishing a new link. The controller 201 may additionally or alternatively interact with the communication channel module 209 to discover and exchange connection information for new links and may interact with the link module 211 to maintain and generate new links 103.

The routing module 203 is configured to facilitate an exchange of network traffic with other nodes (e.g., nodes 105b-105n) of the communication network 101 and nodes of the public safety core 107 and the one or more networks 109-115. For instance, the routing module 203 maintains a routing table indicating pathways and tunnels for routing. In some embodiments, the routing tables are continuously maintained and may include location information from a space-based satellite location system, for instance global positioning system (GPS).

Terminal function module 205 may optionally be included and configured to perform various terminal device functions. For instance, the node 105a may include display, input, and cursor control as illustrated in FIG. 7, and be configured to send and receive messages to computing device 119 via links 103 of communication network 101.

Discovery module 207 is configured to determine whether to establish a new link 103 of communication network 101. In one embodiment, the discovery module 207 works with routing module 203 to determine a proximity of one node 105 to another node 105 based on routing information. For instance, discovery module 207 attempts to establish a link 103 with node 105c when it determines that only two node links 103 separate nodes 105a and 105c. The rationale of this approach is that on purely geometric grounds, a pair of nodes that are 2 network hops from each other are, roughly speaking, at most a physical distance of 2R from each other, where R is the typical radio communications range. But they could be closer than 2R, for example when the two nodes and the intermediate node connecting them are not all co-linear, and/or when each of the nodes 105a and 105c is less than the distance R from the intermediate node. So the 2-hop criterion has a reasonable chance of finding nodes that might be within the distance R of each other. But since this approach only considers nodes separated by 2 hops, this approach would miss node pairs that are separated by longer chains of intermediate links, but which happen to nevertheless be physically close.

Additionally, or alternatively, the discovery module 207 determines a proximity based on location information. Such information may optionally be included in a routing table, for instance, maintained by routing module 203 and may include location information from a space-based satellite location system, for instance GPS and triangulation techniques. Additionally, location information may be continuous, real-time, near real-time, periodic, etc. For instance, discovery module 207 continuously or in near-real time monitors nodes (e.g., 105b-105n) within a broadcast range of node 105a using real-time GPS information of the nodes and initiates an establishment of a new link 103 with nodes within the broadcast range. In some instances, location information indicates a (hex) cell region for each node (e.g., 105.

Communication channel module 209 works with link module 211 to exchange connection information for establishing and maintaining links 103. In one embodiment, the communication channel module 209 utilizes a special secret channel defined and used solely for exchanging connection information for establishing and maintaining links 103. For instance, the special channels may be formed using a set of symbols among a large set of corrupting symbols of a known or unknown channel. Additionally, the set of symbols may be stored in volatile memory to restrict access. Further countermeasures such as masking via intentional emission of noise by electronics may be used to further harden against reverse engineering of communication channel module 209 and/or node 105a.

In some embodiments, the communication channel module 209 utilizes communication session establishment procedures to convey connection information (e.g., key exchange handshake information) to a node 105. Additionally, the communication channel module 209 may directly convey such connection information. For instance, a signal on a direct channel may not relayed by another node 105 but is instead transmitted only by one of the nodes (e.g., 105a) and received by only one other of the nodes 105 (e.g., 105b). In one embodiment, the communication channel module 209 designates paths with a node (e.g., 105) of a mesh network as a direct or indirect channel. For instance, the communication channel module 209 determines a path includes at least one of the nodes 105 that is neither the originator nor an intended recipient of connection information and designates the path as indirect.

Communication channel module 209 may additionally or alternatively be configured to determine or detect cutover activity (e.g., a jamming attack) on a communication channel determined by the communication channel module 209. In one embodiment the communication channel module 209 is configured to detect signals preventing an exchange of information on communication channels. For instance, the communication channel module 209 may work with the communication interface 213 to determine whether a signal substantially overlapping frequency bands used by the communication channel module 209 prevents or otherwise limits an exchange of information on the channel, such as a jamming signal. It is contemplated that a signal may substantially overlap a frequency band when the signal is present in at least 60% or 70% of the frequency band, or at least 80% or 90% of the frequency band. In another embodiment, the communication channel module 209 is configured to monitor an elapsed time after connection information is transmitted to determine cutover activity on the communication channel. For instance, the communication channel module 209 may work with the communication interface 213 to determine whether, within a predefined amount of time, an acknowledgment is received on the communication channel or a link 103 is established using connection information transmitted on the communion channel. Additionally, the communication channel module 209 may determine to cutover from a first channel to a second channel based on the cutover activity. For instance, the communication channel module 209 works with the link module 211 to initiate an indirect channel when the communication channel module 209 determines cutover activity on a direct channel (e.g., the special secret channel).

In yet another embodiment, the communication channel is unaware of an inability to exchange information, cutout activity, and of links 103. As such, the communication channel module 209 may concurrently initiate at least two communication session establishment procedures (e.g., direct and indirect channels) concurrently to convey connection information.

Link module 211 is configured to work with communication channel module 209 to determine signal parameters for establishing and maintaining links 103. For instance, link module 211 generates signal parameters for a new or existing link 103 and transmits the signal parameters using communication interface 213 on a channel indicated by communication channel module 209. In some instances, the link module 211 may periodically, randomly, or pseudo randomly generate and transmit such signal parameters to allow an ongoing key exchange handshake between peer nodes (e.g., 105) within range of each other.

Link module 211 may determine signal parameters for various technologies (e.g., spread spectrum agnostic), such as, for instance, Direct Sequence Code Division Multiple Access (DS-CDMA) and frequency hopping. As such, link module 211 may be configured to establish links 103 to appear as random noise and spread data symbols of the links 103 over a very wide band of spectrum. For instance, link module 211 may use a pseudo-random sequence of "chip" bits known only to sender (e.g., node 105a) and receiver (e.g., node 105b) and combines the chip bits with data bits, making a resulting signal more likely to be detected as noise. Additionally, or alternatively, link module 211 may utilize frequency hopping techniques by, for example, setting a schedule controlled by a pseudo-random sequence that indicates different frequencies on which data bits are to be exchanged. As such, devices lacking the schedule are further restricted from detecting the data bits and from successfully jamming the channel containing the data bits. Furthermore, such technologies may further reduce or eliminate the effectiveness of stealth jamming of a narrow spectrum. For instance, a position of equipment jamming a large portion of spectrum may, in many instances, be comparatively easier to determine than equipment jamming a small portion of spectrum. As such, a resistance to stealth jamming of a small portion of spectrum frequently provides adequate resistance to network attacks.

The node 105a further includes a communication interface 213 to communicate with nodes 105 of communication network 101 and other components of system 100. The communication interface 213 may include multiple means of communication. For example, the communication interface 213 may be able to communicate, over wired and/or wireless, broad-band, spread spectrum and/or narrow-band wireless technology, encrypted or unencrypted, secured or unsecured, proprietary or not proprietary, etc.

It is contemplated that to prevent unauthorized access, node 105a of communication network 101 may include an authentication identifier when exchanging signals within communication network 101 (e.g., on links 103) and when exchanging signals outside the network, for instance, with public safety core 107, and the one or more networks 109-115. For instance, control messages may be encrypted, either symmetrically or asymmetrically, such that a hash value, for instance, can be utilized to authenticate received images, as well as ensure that those signals have not been impermissibly detected in transit. As such, communications between nodes 105 and with public safety core 107 and the one or more networks 109-115 may include various identifiers, keys, random numbers, random handshakes, digital signatures, and the like.

Figure 3:
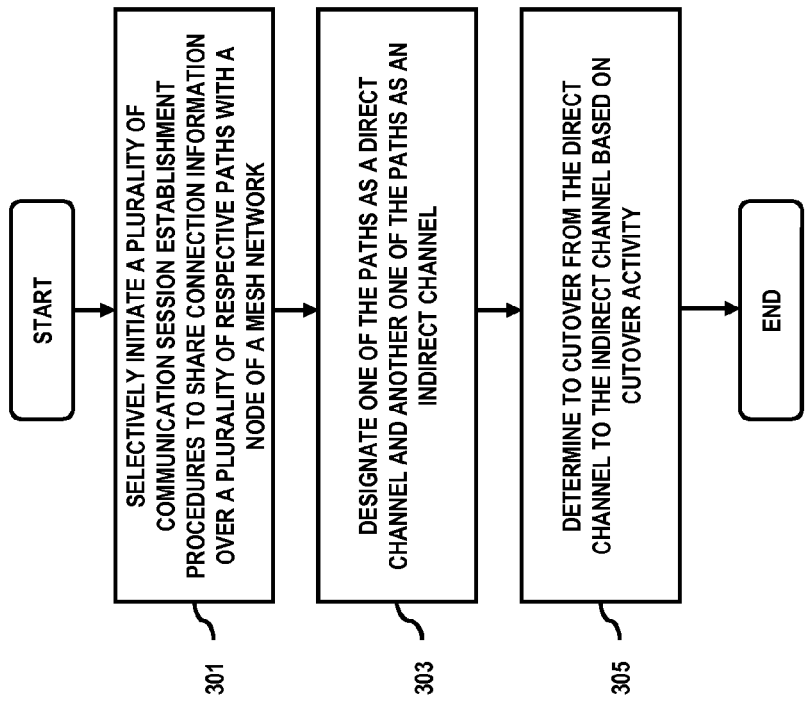
FIG. 3 is a flowchart of a process for forming new links of a mesh network during a network attack, according to one embodiment.

FIG. 3 is a flowchart of a process for forming new links of a mesh network during a network attack, according to one embodiment. For illustrative purpose, process 300 is described with respect to the exemplary node of FIG. 2 and the systems of FIGS. 4A-4C. It is noted that the steps of process 300 may be performed in any suitable order, as well as combined or separated in any suitable manner, for example, steps 303 and 305 may be omitted.

Figures 4A, 4B:
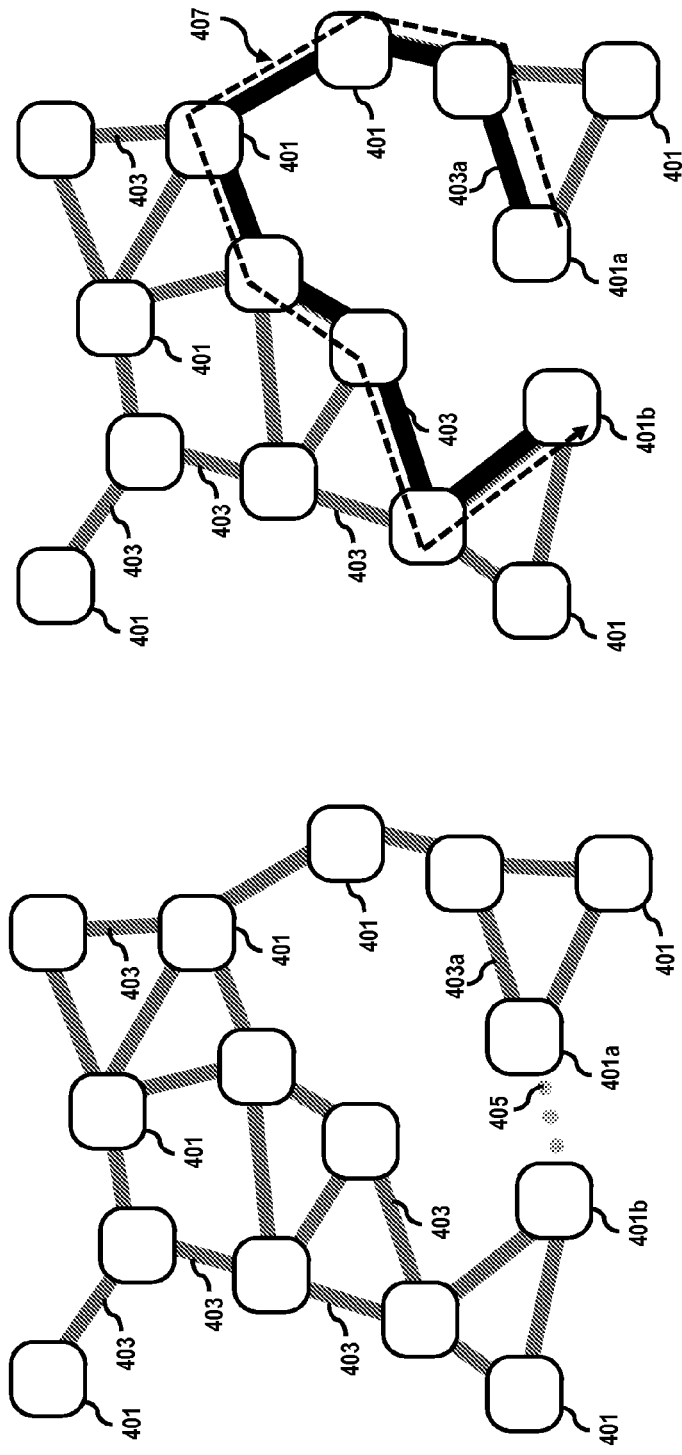
FIGS. 4A through 4C are diagrams showing a mesh network that can establish new links during cutover activity, according to one embodiment.
Figure 4C:
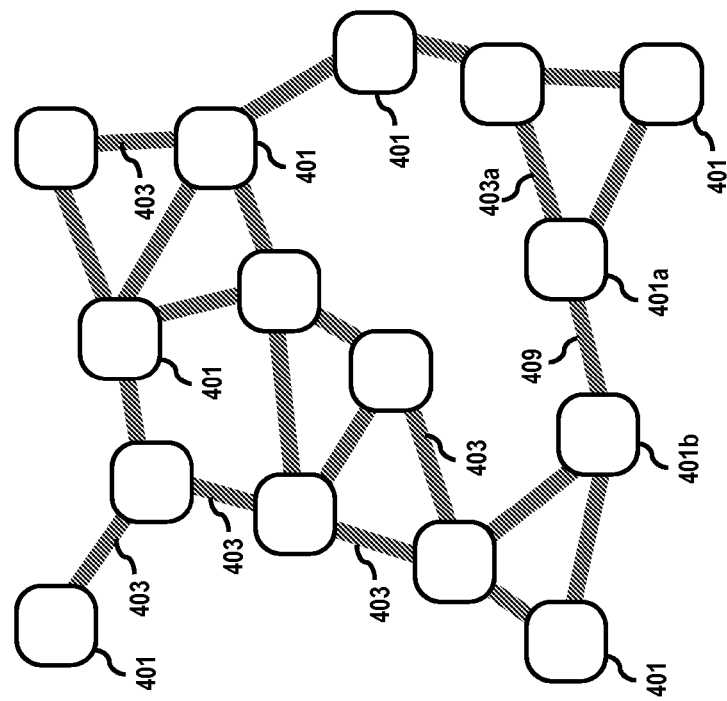

FIGS. 4A-4C are diagrams showing a mesh network that can establish new links during cutover activity, according to one embodiment. Specifically, these figures include a mesh network 400 having nodes 401 connected by links 403. As shown, the nodes 401 may each include a controller 201, routing module 203, terminal function module 205, discovery module 207, communication channel module 209, link module 211, and communication interface 213. Additionally, links 403 utilize various attack resistant technologies, such as, for instance, DS-CDMA and frequency hopping. Mesh network 400 may also be connected to a public safety core 107 and one or more networks 109-115.

Adverting to FIG. 4A, communication channel module 209 of node 401a selectively initiates, as in step 301, a plurality of communication session establishment procedures to share connection information over a plurality of respective paths with a node of a mesh network. For instance, the communication channel module 209 may initiate a direct communication session establishment procedure that is separated from mesh network 400 to generate communication channel 405.

In some embodiments, at least one of the paths is separated from the communication network 101. For instance, as shown, the communication channel 405, being separated from communication network 101, utilizes a narrow band technology (e.g., orthogonal frequency division multiple access, Wi-Fi, etc.) on a special channel known to all nodes 401, while the links 403 of communication network 101 utilize a spread spectrum technology (e.g., DS-CDMA and frequency hopping) on a private channel between two of the nodes 401 using a shared secret (e.g., Diffie-Hellman key) known only to the two nodes. Additionally, as shown, routing between nodes 401 on links 403 utilizes a separate routing table (and protocols) than routing on communication channel 405. For instance, routing module 203 may maintain routing tables for exchanging network traffic of the mesh network 400 on links 403 and communication channel module 209 may separately maintain other routing tables for exchanging network traffic via communication channel 405.

As illustrated in FIG. 4B, routing module 203 of node 401a may additionally or alternatively, selectively initiate an indirect communication session establishment procedure that is of mesh network 400 to generate a new link via link 403a of the mesh network 400. For instance, node 401a transmits (e.g., P2P, multicast, etc.) one or more signal parameters of a spread-spectrum signal for establishing a link between nodes 401a and 401b via the link 403a and on pathway 407. Such a transmission may be broadcasted via, for instance, a P2P topology between nodes 105 and/or multicast to a plurality of nodes 105.

In some embodiments, the communication channel module 209 (concurrently) initiates an indirect communication session establishment procedure utilizing existing pathways (e.g., links 403) of the mesh network 400 and steps 303 and 305 are omitted. For instance, the node 401a may be unaware of cutover activity (e.g., a radio jamming signal) and whether node 401b has received connection information and may, for instance, periodically (and concurrently) send connection information on a communication channel (e.g., 405) and a link (e.g., 403) to convey connection information (e.g., key exchange handshake information). Thus, nodes (e.g., 401) may continue to succeed to share connection information via links 401 without awareness of cutover activity (e.g., a network attack), thereby allowing a simpler implementation.

In some embodiments, the communication channel module 209 designates, as in step 303, a direct and indirect channel. For instance, the communication channel module 209 designates communication channel 405 as a direct communication because signals utilizing the channel 405 are not relayed, and designates the pathway 407 as indirect because signals utilizing the pathway 407 are relayed by nodes 401.

The communication channel module 209 may optionally cutover, as in step 307, from the direct to indirect channel based on cutover activity. In some embodiments, cutover activity includes a jamming attack. For instance, node 401a detects a radio jamming signal overlapping one or more frequency bandwidths associated with a communication channel 405. Such detection of a radio jamming signal may be by, for instance, a direct analysis of radio frequency signals and/or by indirect effects of an attack, such as jumps in levels of packet re-sent in transport layer 4. Additionally or alternatively, cutover activity includes a determination to receive, within a predefined period of time, an indication that a node has received connection information. In one embodiment, node 401a broadcasts the connection information to node 401b on the communication channel 405 and determines to receive, within a predefined period of time, an indication that node 401b has received the connection information. For example, node 401a broadcasts connection information to node 401b and waits the predetermined time for node 401b to initiate a link or send an acknowledgment via the communication channel 405. In some embodiments, communication channel module 209 initiates a communication session establishment procedure to share connection information on the designated indirect channel when cutover activity is detected. For instance, communication channel module 209 concurrently initiates a plurality of communication session establishment procedures, including the indirect channel, to share connection information on the designated indirect channel when cutover activity is detected. In another example, the communication channel module 209 ends or terminates the direct communication session establishment procedure and initiates to share connection information on the designated indirect channel when cutover activity is detected. It is noted that the communication channel module 209 may initiate the indirect channel to share connection information prior to the termination of the direct channel to allow simultaneous or concurrent communication of the connection information.

Next and as illustrated in FIG. 4C, link module 211 of node 401a (or 401b) establishes new link 409 based on the connection information shared via link 403a. For instance, node 401b establishes a spread-spectrum signal with node 401a using the received one or more signal parameters.

Figure 5:
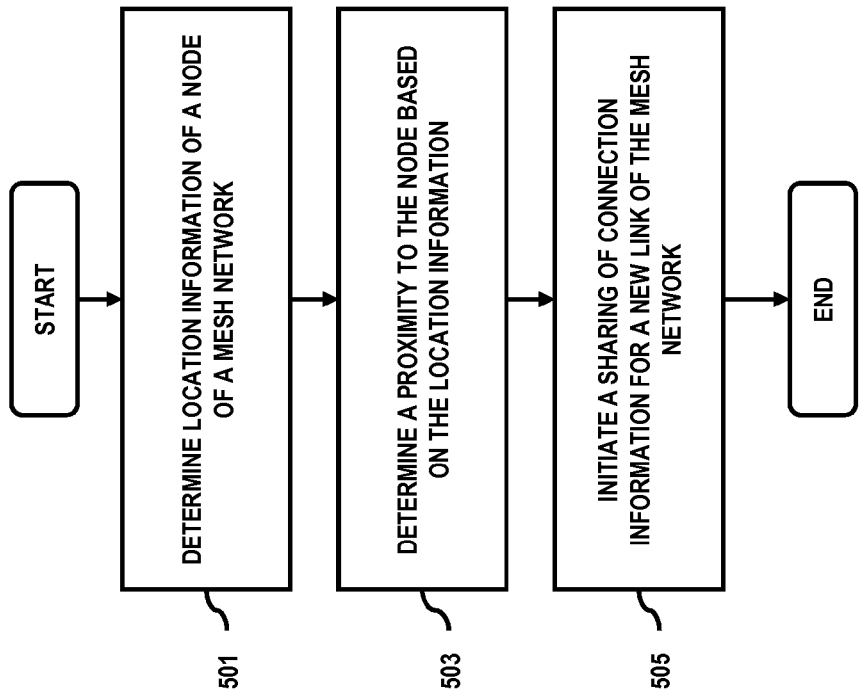
FIG. 5 is a flowchart of a process for detecting nodes to connect during an attack of a mesh network, according to one embodiment.

FIG. 5 is a flowchart of a process for detecting nodes to connect during an attack of a mesh network, according to one embodiment. For illustrative purpose, process 500 is described with respect to the exemplary node of FIG. 2 and the system of FIG. 6. It is noted that the steps of process 500 may be performed in any suitable order, as well as combined or separated in any suitable manner.

Figure 6:
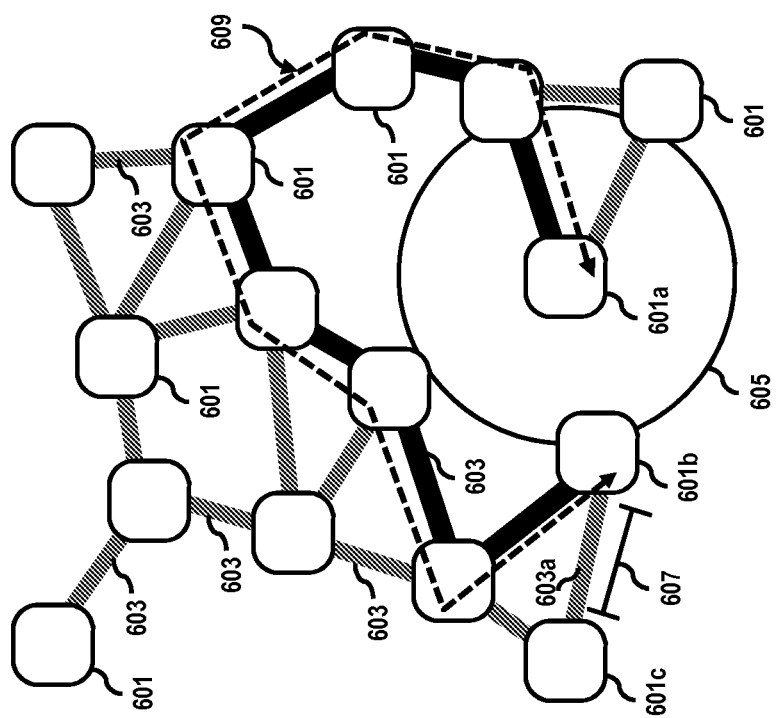
FIG. 6 is a diagram showing the detection process of FIG. 5 applied to a mesh network, according to one embodiment.

As seen in FIG. 6, a mesh network 600 has nodes 601 connected by links 603. According to one embodiment, the nodes 601 may each include a controller 201, routing module 203, terminal function module 205, discovery module 207, communication channel module 209, link module 211, and communication interface 213. Additionally, links 603 utilize various attack resistant technologies, such as, for instance, DS-CDMA and frequency hopping. Mesh network 600 may also be connected to a public safety core 107 and one or more networks 109-115.

In step 501, discovery module 207 of node 601a determines location information of a node 601b of mesh network 600. For instance, discovery module 207 accesses a routing table of routing module 203 to determine location information of node 601b. In one embodiment, such location information is derived from logical links connecting the nodes 601. For instance, the discovery module 207 may determine node 601b to be proximate to node 601a based on the location information of node 601c and the detection of a link 603a directly connecting nodes 601b and 601c. That is, although node 601c is outside a broadcast range 605 of node 601a, node 601b, which is within a distance 607 of node 601c, may be within the broadcast range 605. In another embodiment, the discovery module 207 determines a location of node 601b based on broadcast information periodically transmitted on pathway 609. In some embodiments, the location information may indicate a (hex) cell and proximity is based on the indicated cell. Next, in step 503, the discovery module 207 of node 601a determines a proximity to the node based on the location information. For instance, the discovery module 207 of node 601a compares the determined location information of node 601b with a current detected GPS location of node 601a, an estimated location of node 601a based on triangulation data, and the like. Next, link module 211 of node 601a initiates, as in step 505, a sharing of connection information for a new link of the mesh network 600. For instance, the discovery module 207 of node 601a works with communication channel module 209 to establish a communication channel for transmitting connection information and/or transmits the connection information via pathway 609, for example, as described in FIG. 3.

The processes described herein for providing an attack resistant mesh network may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 7 is a diagram of a computer system that can be used to implement various exemplary embodiments. The computer system 700 includes a bus 701 or other communication mechanism for communicating information and one or more processors (of which one is shown) 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk, flash storage, or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. Additional output mechanisms may include haptics, audio, video, etc. An input device 713, such as a keyboard including alphanumeric and other keys, is coupled to the bus 701 for communicating information and command selections to the processor 703. Another type of user input device is a cursor control 715, such as a mouse, a trackball, touch screen, or cursor direction keys, for communicating direction information and command selections to the processor 703 and for adjusting cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to computer-readable storage medium ((or non-transitory)—e.g., non-volatile media and volatile media), and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 8 illustrates a chip set or chip 800 upon which an embodiment of the invention may be implemented. Chip set 800 is programmed to enable improved approaches for allowing new links of a mesh network to be formed during an attack of the network as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of enabling improved approaches for allowing new links of a mesh network to be formed during an attack of the network.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to enable improved approaches for allowing new links of a mesh network to be formed during an attack of the network. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   initiating concurrently a plurality of communication session establishment procedures to share connection information over a plurality of respective paths with a node of a mesh network, at least one of the paths being separated from the mesh network,
   wherein the connection information is used to establish one link of the mesh network,
   wherein each the plurality of communication establishment procedures includes a key exchange handshake, and
   wherein the plurality of communication session establishment procedures to perform the key exchange handshake comprise (a) using a narrow-band technology, (b) using designated spread spectrum channel between a pair of nodes, wherein the designated spread spectrum channel plays no role in bearing actual data and signaling traffic that passes over the established link during the course of mesh operation, and (c) using indirect multi-hop routed paths between the pair of nodes.

2. The method according to claim 1, further comprising:
   designating one of the paths as a direct channel and another one of the paths as an indirect channel.

3. The method according to claim 1, further comprising:
   determining location information of the node based on routing information of the mesh network; and
   determining a proximity to the node based on the location information, wherein the selective initiation is based on the determined location information.

4. The method according to claim 3, wherein the routing information indicates a real-time or a near real-time position of the node, and the location information is according to the indicated position.

5. An apparatus comprising:
   at least one processor; and
   at least one memory including computer program code for one or more programs,
   the at least one memory and the computer program code configured to, with the at least one processor, cause the apparatus to perform at least the following,
   initiation concurrently of a plurality of communication session establishment procedures to share connection information over a plurality of respective paths with a node of a mesh network, at least one of the paths being separated from the mesh network,
   wherein the connection information is used to establish one link of the mesh network,
   wherein each the plurality of communication establishment procedures includes a key exchange handshake, and
   wherein the plurality of communication session establishment procedures to perform the key exchange handshake comprise (a) using a narrow-band technology, (b) using designated spread spectrum channel between a pair of nodes, wherein the designated spread spectrum channel plays no role in bearing actual data and signaling traffic that passes over the established link during the course of mesh operation, and (c) using indirect multi-hop routed paths between the pair of nodes.

6. The apparatus according to claim 5, wherein the apparatus is further caused to:
   designate one of the paths as a direct channel and another one of the paths as an indirect channel.

7. The apparatus according to claim 5, wherein the apparatus is further caused to:
   determine location information of the node based on routing information of the mesh network; and
   determine a proximity to the node based on the location information, wherein the selective initiation is based on the determined location information.

8. The apparatus according to claim 7, wherein the routing information indicates a real-time or a near real-time position of the node and the location information is according to the indicated position.

9. A system comprising:
   a first node of a mobile ad-hoc network (MANET) configured to route network traffic on at least a first wireless spread-spectrum signal of the MANET;
   a second node of the MANET configured to route network traffic on at least the first wireless spread-spectrum signal and on a second wireless spread-spectrum signal of the MANET; and
   a third node of the MANET configured to:

initiate an indirect communication session establishment procedure to share connection information to the first node on an indirect path including at least the first and second wireless spread-spectrum signals; and concurrently initiate a direct communication session establishment procedure to share connection information to the first node on a direct path via a communication channel, the communication channel being separated from the MANET network, wherein the connection information is used to establish a third wireless spread-spectrum signal of the MANET between the first and third nodes, and the first, second, and third wireless spread-spectrum signal have different signal parameters, wherein each of the indirect communication session establishment procedure and the direct communication session establishment procedure includes a key exchange handshake, and wherein said each of the indirect communication session establishment procedure and the direct communication session establishment procedure to perform the key exchange handshake comprise (a) using a narrow-band technology, (b) using designated spread spectrum channel between a pair of nodes, wherein the designated spread spectrum channel plays no role in bearing actual data and signaling traffic that passes over an established link during the course of mesh operation, and (c) using indirect multi-hop routed paths between the pair of nodes.

10. The system according to claim 9, wherein the third node is further configured to:

determine routing information of the MANET network, the routing information including location information indicating a real-time or a near real-time position of the first node;

determine a proximity of the third node to the first node based on the location information; and selectively initiate the direct and/or indirect communication session establishment procedures based on the determined location information.

11. The method according to claim 2, further comprising:

determining location information of the node based on routing information of the mesh network; and determining a proximity to the node based on the location information, wherein the selective initiation is based on the determined location information.

12. The method according to claim 11, wherein the routing information indicates a real-time or a near real-time position of the node, and the location information is according to the indicated position.

13. The method according to claim 2, wherein the plurality of communication session establishment procedures to perform the key exchange handshake comprise (a) using a narrow-band technology, (b) using designated spread spectrum channel between a pair of nodes, wherein the designated spread spectrum channel plays no role in bearing actual data and signaling traffic that passes over the established link during the course of mesh operation, and (c) using indirect multi-hop routed paths between the pair of nodes.

14. The method according to claim 3, wherein the plurality of communication session establishment procedures to perform the key exchange handshake comprise (a) using a narrow-band technology, (b) using designated spread spectrum channel between a pair of nodes, wherein the designated spread spectrum channel plays no role in bearing actual data and signaling traffic that passes over the established link during the course of mesh operation, and (c) using indirect multi-hop routed paths between the pair of nodes.

15. The apparatus according to claim 6, wherein the apparatus is further caused to:

determine location information of the node based on routing information of the mesh network; and determine a proximity to the node based on the location information, wherein the selective initiation is based on the determined location information.

16. The apparatus according to claim 15, wherein the routing information indicates a real-time or a near real-time position of the node and the location information is according to the indicated position.

17. The apparatus according to claim 6, wherein the plurality of communication session establishment procedures to perform the key exchange handshake comprise (a) using a narrow-band technology, (b) using designated spread spectrum channel between a pair of nodes, wherein the designated spread spectrum channel plays no role in bearing actual data and signaling traffic that passes over the established link during the course of mesh operation, and (c) using indirect multi-hop routed paths between the pair of nodes.

18. The apparatus according to claim 7, wherein the plurality of communication session establishment procedures to perform the key exchange handshake comprise (a) using a narrow-band technology, (b) using designated spread spectrum channel between a pair of nodes, wherein the designated spread spectrum channel plays no role in bearing actual data and signaling traffic that passes over the established link during the course of mesh operation, and (c) using indirect multi-hop routed paths between the pair of nodes.

* * * * *